UNITED STATES PATENT OFFICE.

HERMAN MAYER, OF NEW YORK, N. Y.

RUBBER SUBSTITUTE.

1,094,580.

Specification of Letters Patent.

Patented Apr. 28, 1914.

No Drawing.

Application filed April 8, 1913. Serial No. 759,802.

*To all whom it may concern:*

Be it known that I, HERMAN MAYER, a citizen of the United States, and a resident of the borough of Manhattan, city, county, and State of New York, have invented a certain new and useful Rubber Substitute, of which the following is a specification.

The object of my invention is the production of a relatively insoluble elastic resilient composition of matter adapted to various purposes and uses as hereinafter set forth.

What may be designated as the basic or determining ingredient of my composition is a predominating quantity of vegetable oil to which magnesia is added as a filler or cohesive to produce a semi-solid substance which may be diluted more less by means of a volatile petroleum oil or the like prior to its treatment with chlorid of sulfur for the purpose of effecting the requisite degree of solidification of the product according to the purpose for which it is designed—formaldehyde being used under certain conditions for the purpose of retarding the setting of the composition. By this means I attain a compound which is practically insoluble under ordinary conditions of use, and which is elastic and resilient, like unto caoutchouc and the compounds and variations thereof, known commercially as "rubber," for which my composition may be substituted, in whole or in part, for numerous purposes.

By varying the proportions of the component parts thereof I can materially modify the character of my composition without departing from the essential features of my invention which consist primarily in rendering vegetable oil adhesive, coherent and tenacious by means of a magnesia filler, using a volatile petroleum oil or the like as a diluent, and determining the degree of viscosity, semi-solidity and toughness of the resultant mass by means of chlorid of sulfur,—formaldehyde being incidentally used in some cases as a retardative. Thus, with the understanding that I do not limit myself to the relative proportions of ingredients herein named by way of exemplifying the practical application of my invention, the following formula is given by way of illustrating the production of a tough, viscous, semi-solid composition adapted for various commercial purposes, the named quantities of ingredients being small but capable of increase in proportion, according to the amount of composition required.

While any vegetable oil, or combination of vegetable oils, may be used, I have attained desirable results by the use of, say, one and one half ounces of cotton seed oil mixed with a like quantity of castor oil. To this three ounces of vegetable oil I add one sixth of an ounce of magnesia, stirred into and thoroughly mixed with the oil. This filler of magnesia combines with the vegetable oil to form a viscous adhesive, coherent compound, which I dilute somewhat by means of volatile petroleum oil or the like such as benzin, kerosene, or the like, an ounce or so of the petroleum oil or the like diluent being stirred into the mass. To this diluted compound of oil and magnesia I add approximately one third of an ounce of chlorid of sulfur in suitable solvent, thoroughly mixing the ingredients, and then allowing the admixture to set or congeal into permanent form.

If it is desired to delay the congealation of the mass in order to afford time for manipulation, as where the homogeneous admixture is to be introduced into a mold or envelop before it has time to set permanently, I mix with the diluted compound of vegetable oil and magnesia preparatory to the introduction of the chlorid of sulfur, approximately one sixteenth of an ounce, of formaldehyde,—the extent of retardation effected depending on the quantity of formaldehyde thus introduced. By this means I am enabled to use my composition effectively as a filling for rubber tire tubes in lieu of air, producing practically a semi-solid elastic resilient non-collapsible tire with all of the advantages of a pneumatic tire and without any of the disadvantages or dangers thereof, since a "blow out" is impossible and the puncture of the rubber tube would not result in its collapse, the filling reinforcing and sustaining the rubber tube until the latter is worn out.

I have obtained most satisfactory results by employing substantially the following proportions:—

| | |
|---|---|
| Castor oil | 32 per cent. |
| Cotton seed oil | 32 per cent. |
| Formaldehyde | 3 per cent. |
| Petrol oil | 21 per cent. |
| Sulfur chlorid | 7 per cent. |
| Magnesia | 5 per cent. |
| | 100 " |

By varying the relative proportions of vegetable oil, magnesia and chlorid of sulfur I am enabled to produce a tenacious elastic resilient basic composition adapted to various uses in the arts, and as a substitute in many respects for caoutchouc or "commercial" rubber and similar compounds. Thus my composition may be used as basic carrier or vehicle for comminuted emery or other abrasive in the manufacture of erasers, and without abrasives as a substitute for "artists' gum" and other forms of relatively soft erasers and cleaners. By increasing its consistency or degree of hardness by the use of a larger percentage of chlorid of sulfur it may be adapted for use as substitute for rubber and other forms of elastic resilient treads, packings, &c.; for the manufacture of "rubber" toys, dolls, &c., and for an infinite variety of uses and purposes where compressibility and resilience of material are essential or desirable. The character of the vegetable oil used may also be considered as affecting the color and appearance of the product, castor oil particularly, affording an attractive clear white product; although obviously in this connection various coloring agents or pigments may be readily added to the composition as may be found expedient in practice without affecting its other qualities or functions.

The simplicity and cheapness of my composition, its tenacity, flexibility and resilience, render it valuable as a product available as a substitute for rubber and its various compounds, and for numerous other commercial uses and purposes. Furthermore it is not affected by ordinary variations in temperature, will withstand ordinary extremes of heat or cold, and is essentially insoluble and non-decomposable.

What I claim as my invention and desire to secure by Letters Patent is,

As a rubber substitute, an elastic resilient composition of matter of the character designated, formed of the following ingredients in substantially the proportions stated, viz:—castor oil, thirty-two per cent., cotton seed oil thirty-two per cent., formaldehyde three per cent., petrol oil twenty-one per cent., sulfur chlorid seven per cent., and magnesia five per cent.

HERMAN MAYER.

Witnesses:
 GEO. WM. MIATT,
 LILLIA MIATT.